(12) United States Patent  (10) Patent No.: US 9,846,349 B2
Foster                     (45) Date of Patent:     Dec. 19, 2017

(54) LENS COVERS

(71) Applicant: Sensors Unlimited, Inc., Princeton, NJ (US)

(72) Inventor: John T. Foster, Morrisville, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/142,869

(22) Filed: Apr. 29, 2016

(65) Prior Publication Data

US 2017/0315425 A1    Nov. 2, 2017

(51) Int. Cl.
*G02B 26/02* (2006.01)
*G03B 11/04* (2006.01)

(52) U.S. Cl.
CPC .......... *G03B 11/048* (2013.01); *G03B 11/043* (2013.01)

(58) Field of Classification Search
CPC ... G02B 11/043; G02B 11/045; G02B 11/046; G02B 11/048; G02B 11/06; G02B 9/22; G02B 7/10; G02B 7/097; G02B 9/14

USPC ......................................................... 359/233
See application file for complete search history.

(56) References Cited

U.S. PATENT DOCUMENTS

| 3,169,464 | A | 2/1965 | Koppen |
| 4,494,846 | A | 1/1985 | Kurosu et al. |
| 7,534,058 | B2 | 5/2009 | Ho |
| 7,866,901 | B2 * | 1/2011 | Tsuji ................. G03B 9/14 396/448 |
| 8,075,205 | B2 * | 12/2011 | Fujiwara ............. G03B 17/00 359/511 |

* cited by examiner

*Primary Examiner* — Euncha Cherry
(74) *Attorney, Agent, or Firm* — Locke Lord LLP; Scott D. Wofsy; Joshua L. Jones

(57) ABSTRACT

A lens cover includes a housing defining an optical aperture. A pair of opposed lens cover blades are each pivotally mounted to the housing at a common pivot point. A biasing member biases the blades apart from one another about the pivot point to uncover the optical aperture in an open position. A pair of magnetic members is included, each magnetic member being mounted to a respective one of the blades to bias the blades together to cover the optical aperture in a closed position.

17 Claims, 5 Drawing Sheets

LENS COVERS

BACKGROUND OF THE INVENTION

1. Field of the Invention

The present disclosure relates to optics, and more particularly to lens covers such as used in covering lenses for cameras, scopes, laser illuminators, and the like.

2. Description of Related Art

Typical lens covers fall into two categories. First is a relatively low cost rubber cap which flips upward to reveal the underlying optics. The second is a multi-blade mechanical iris, such as found on high-end digital single-lens reflex (DSLR) lenses. While this second category is more costly, it is also sturdier and more effective.

Such conventional methods and systems have generally been considered satisfactory for their intended purpose. However, there is still a need in the art for improved lens covers. The present disclosure provides a solution for this need.

SUMMARY OF THE INVENTION

A lens cover includes a housing defining an optical aperture. A pair of opposed lens cover blades are each pivotally mounted to the housing at a common pivot point. A biasing member biases the blades apart from one another about the pivot point to uncover the optical aperture in an open position. A pair of magnetic members is included, each magnetic member being mounted to a respective one of the blades to bias the blades together to cover the optical aperture in a closed position.

A plunger can be mounted to the housing wherein in the closed position of the blades, the plunger is configured to translate relative to the housing and separate the blades to a position where the biasing member overpowers the magnetic members to drive the blades to the open position. A respective pusher arm can extend from each blade. The pusher arms can be opposed to one another and extend radially outward from the blades, wherein in the open position the pusher arms are configured to be driven inward to a position where the magnetic members overpower the biasing member to secure the blades in the closed position. In the open position of the blades, the pusher arms can extend visibly beyond the housing. A portion of at least one of the pusher arms that is visible beyond the housing in the open position can be colored as an indicium of the optical aperture being open.

The biasing member can include a torsion spring positioned about the pivot point. The magnetic means can include at least one rare earth magnet.

The blades can be identical to one another and can be mounted to the pivot point in mirror image opposition to one another. In the closed position the blades can overlap one another along a respective ledge defined on each blade. The ledge of each blade can include a semicircular protrusion covering a central portion of the optical aperture with the blades in the closed position. The blades can substantially clear the optical aperture in the open position.

The pivot point can be off-center from the optical aperture. The housing can include a pair of plates enclosing the pivot point and between which the blades are substantially hidden in the open position. The housing can include channels for mounting the housing to an optical device.

An optical device includes an optical component with a lens barrel defining an optical path. The device also includes a lens cover as in any of the embodiments described herein mounted to the lens barrel to cover the optical path in the closed position of the blades and to uncover the optical path in the open position of the blades.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
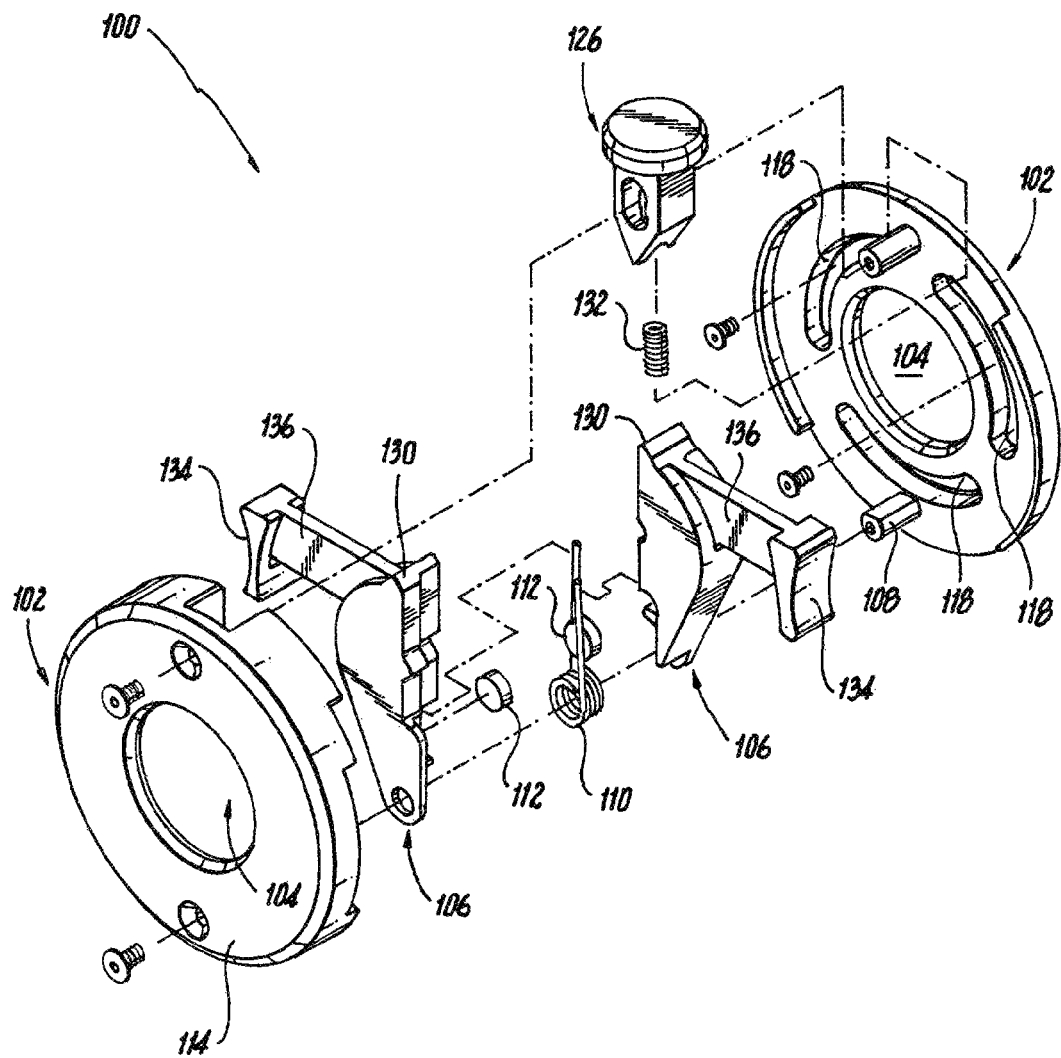
FIG. 1 is an exploded perspective view of an exemplary embodiment of a lens cover constructed in accordance with the present disclosure, showing the blades and plunger.

Reference will now be made to the drawings wherein like reference numerals identify similar structural features or aspects of the subject disclosure. For purposes of explanation and illustration, and not limitation, a partial view of an exemplary embodiment of a lens cover in accordance with the disclosure is shown in FIG. 1 and is designated generally by reference character 100. Other embodiments of lens covers in accordance with the disclosure, or aspects thereof, are provided in FIGS. 2-6, as will be described. The systems and methods described herein can be used to securely and reliably cover optical lenses such as in cameras, scopes, laser illuminators, and the like.

Lens cover 100 includes a housing 102 defining an optical aperture 104. A pair of opposed lens cover blades 106 are each pivotally mounted to the housing 102 at a common pivot point 108. The pivot point 108 is off-center from the optical aperture 104. The housing 102 includes a pair of plates, namely front retaining plate 114 and rear retaining plate 116, enclosing the pivot point 108. The housing 102 includes channels 118 defined through rear retaining plate 116 for mounting the housing 102 to an optical device, such as optical device 10 shown in FIG. 6.

Referring now to FIG. 1, a biasing member 110 biases the blades 106 apart from one another about the pivot point 108 to uncover the optical aperture 104 in an open position of the blades 106. A pair of magnetic members 112 is included, each magnetic member 112 being mounted to a respective one of the blades 106 to bias the blades 106 together to cover the optical aperture 104 in a closed position shown in FIG.

3. Housing 102 can be made of a non-magnetic material such as aluminum, magnesium, a polymer, or the like, to avoid interfering with the operation of magnetic members 112. The biasing member 110 includes a torsion spring positioned about the pivot point 108. The magnetic means include a pair of rare earth magnets. Together, the torsion spring and magnets define a bi-stable mechanism in which a force threshold must be overcome each time when moving from the open to the closed position and vice versa. In the closed position, the magnets bias the blades 106 closed until the blades are forced far enough apart for the torsion spring to overcome the weakened magnetic force. In the open position, the torsion spring biases the blades apart until the blades are brought close enough together for the magnetic force to overcome the spring force. Those skilled in the art will readily appreciate that the torsion spring and magnets are but one example, and that any other suitable type of biasing members can be used to provide the bi-stable mechanism without departing from the scope of this disclosure.

Figure 2:
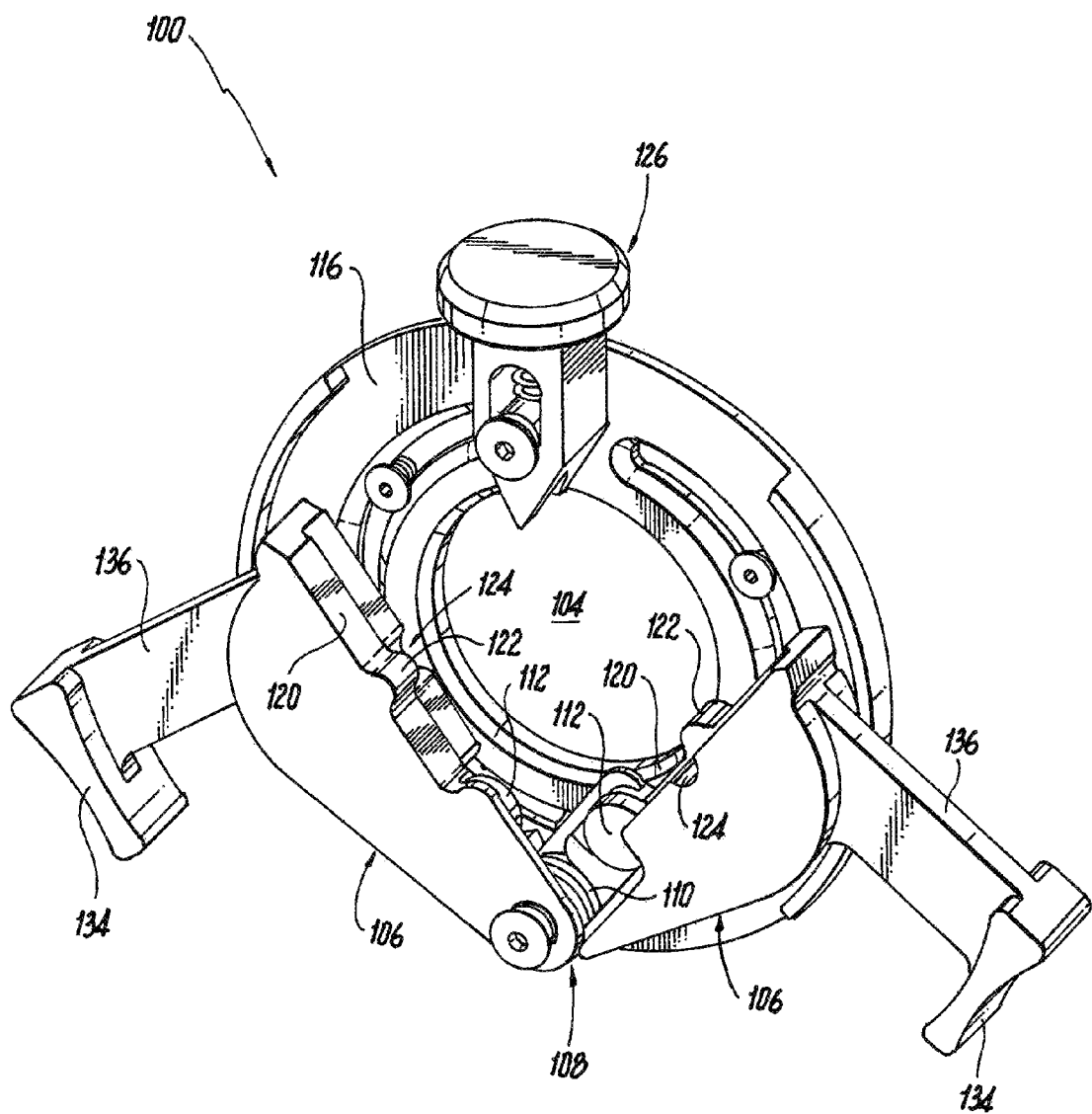
FIG. 2 is a perspective view of the lens cover of FIG. 1, showing the blades in the open position with the front retaining plate removed.
Figure 4:
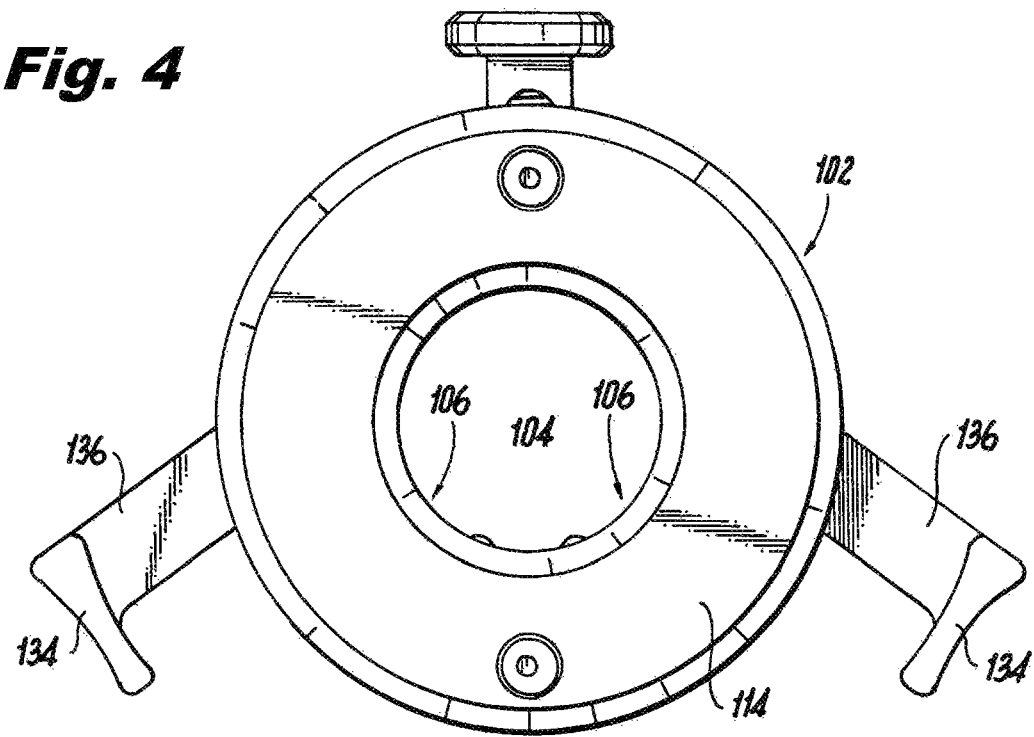
FIG. 4 is an end elevation view of the lens cover of FIG. 1, showing the blades in the open position.
Figure 5:
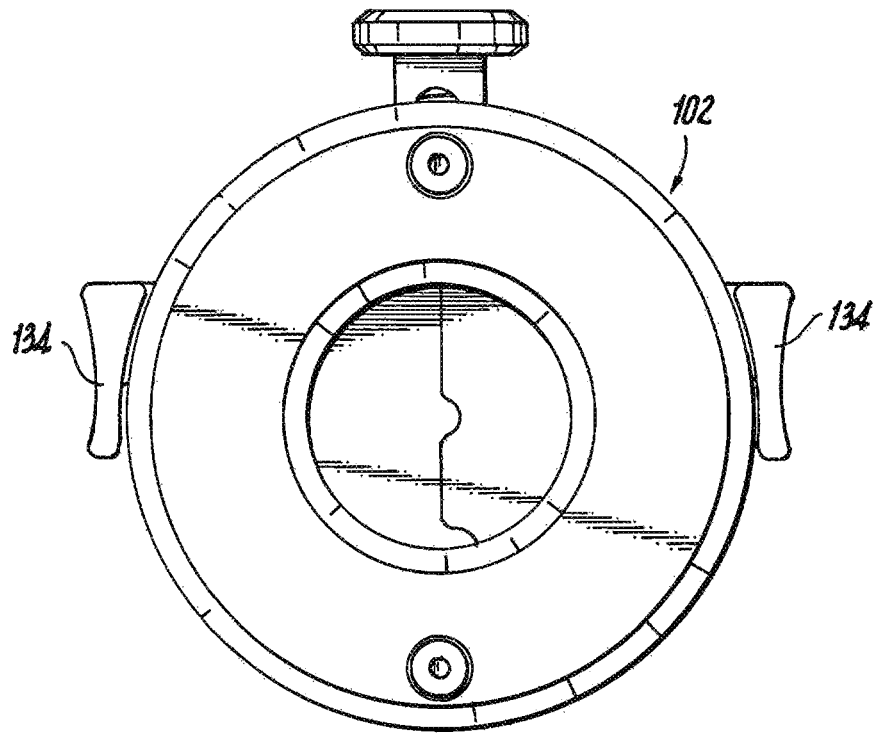
FIG. 5 is an end elevation view of the lens cover of FIG. 1, showing the blades in the closed position.

The blades 106 are substantially hidden between the front and rear retaining plates 114 and 116 in the open position, as can be seen by comparing FIG. 2 which shows the front retaining plate 114 removed, and FIG. 4, which shows the front retaining plate 114 in place. As shown in FIG. 4, the blades 106 substantially clear the optical aperture 104 in the open position.

With reference again to FIG. 2, the blades 106 are identical to one another and are mounted to the pivot point 108 in mirror image opposition to one another. In the closed position shown in FIG. 3, the blades 106 overlap one another along a respective ledge 120 defined on each blade as shown in FIG. 2. The ledge 120 of each blade 106 includes a semicircular protrusion 122 and corresponding receptacle 124 for covering a central portion of the optical aperture 104 with the blades in the closed position as shown in FIG. 3.

Figure 3:
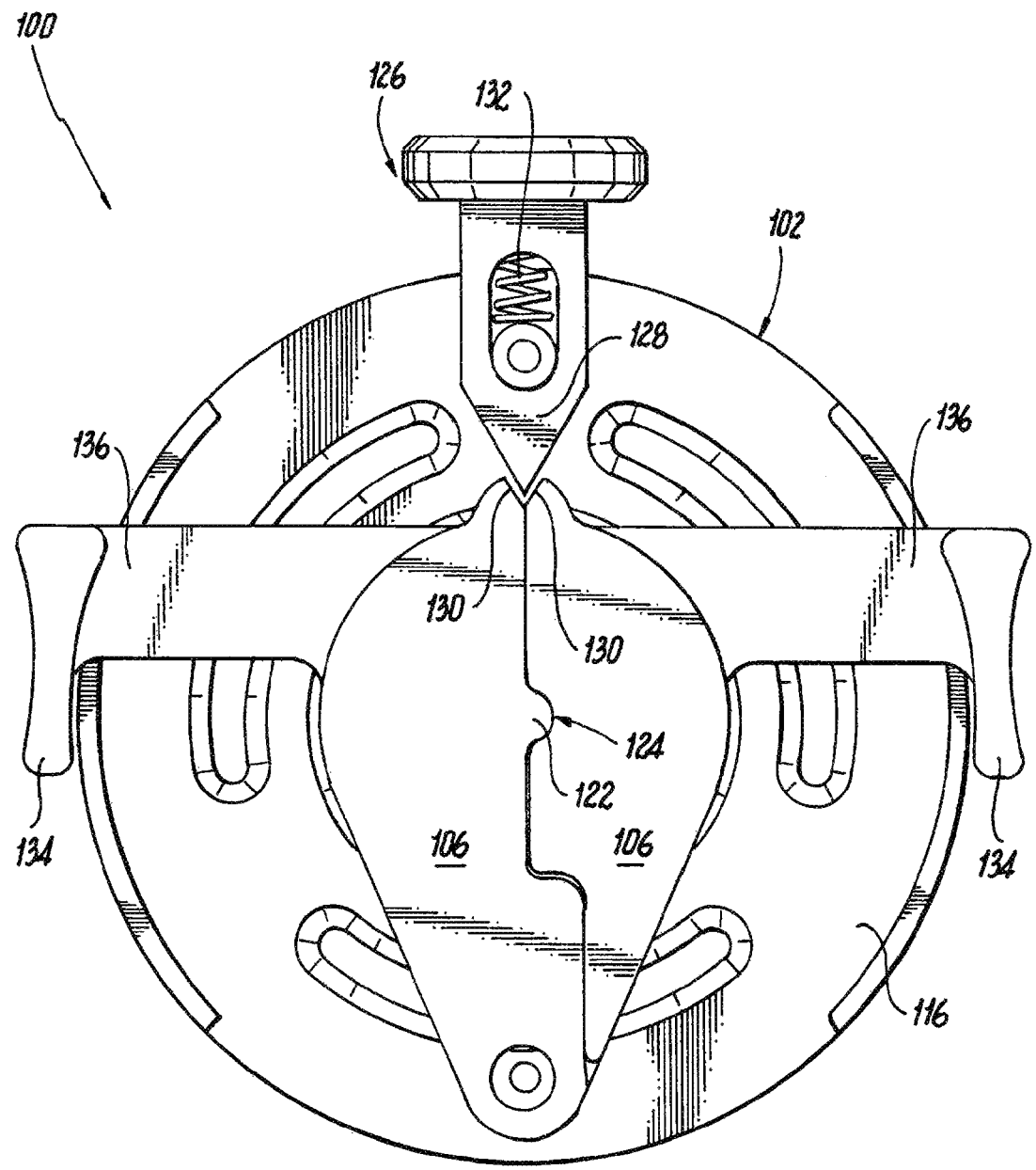
FIG. 3 is an end elevation view of the lens cover of FIG. 1, showing the blades in the closed position with the front retaining plate removed.

Referring now to FIG. 3, a plunger 126 is mounted to the housing 102 wherein in the closed position of the blades 106, the plunger 126 is configured to translate relative to the housing, i.e., downward as oriented in FIG. 3, and separate the blades 106 to a position where the biasing member 110 shown in FIG. 1 overpowers the magnetic members 112 to drive the blades 106 to the open position. Plunger 126 includes a wedge 128 which interacts with opposed wedge receptacle faces 130 of blades 106 to drive blades 106 apart as plunger 128 is depressed. A plunger spring 132 returns plunger 126 to its initial position after being depressed to separate blades 106.

With reference now to FIG. 4, a respective pusher arm 134 extends from each blade 106. The pusher arms 134 are opposed to one another and extend radially outward from the blades 106. In the open position shown in FIG. 4, the pusher arms 134 are configured to be driven inward to a position where the magnetic members 112, shown in FIG. 1, overpower the biasing member 110, also shown in FIG. 1, to secure the blades 106 in the closed position shown in FIG. 5. In the open position of the blades 106 shown in FIG. 4, the pusher arms extend visibly beyond the housing 102. A portion 136 of each pusher arm 134 that is visible beyond the housing 102 in the open position can be colored as an indicium of the optical aperture 104 being open. This colored portion 136 is hidden in the closed position shown in FIG. 5.

Figure 6:
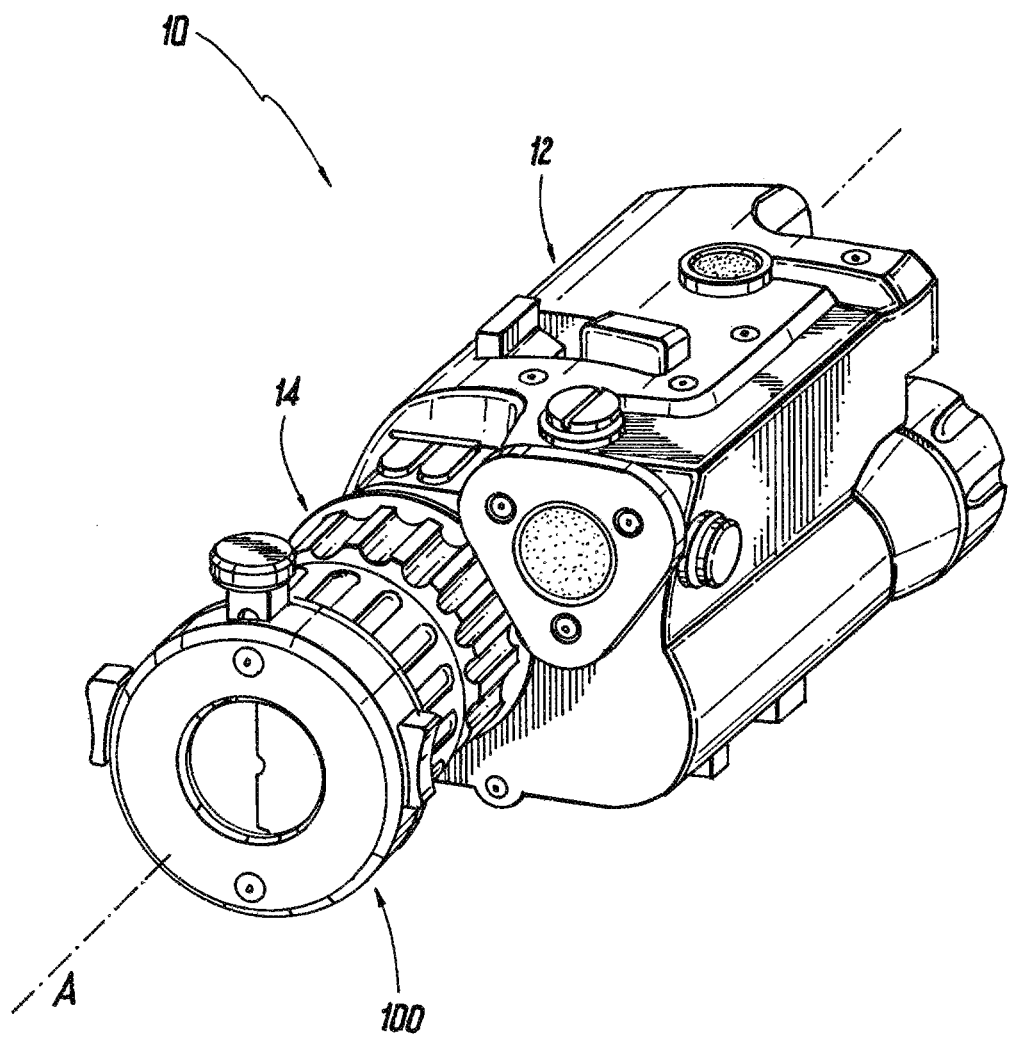
FIG. 6 is a perspective view of an exemplary embodiment of an optical device constructed in accordance with the present disclosure, showing the lens cover of FIG. 1 mounted to the lens barrel of the optical device.

With reference now to FIG. 6, an optical device 10, such as a camera, scope, laser illuminator, or the like, includes an optical component 12 with a lens barrel 14 defining an optical path A. The device 10 also includes a lens cover 100 as in any of the embodiments described herein mounted to the lens barrel 14 to cover the optical path A in the closed position of the blades 106 and to uncover the optical path A in the open position of the blades 106.

Lens cover 100 can potentially be made to have a small footprint and the blades 106 are always contained within the housing 102 for robustness, giving benefits similar to traditional iris blade type lens covers. However lens cover 100 is also potentially much simpler to manufacture than traditional iris blade type lens covers, which potentially provides the low-cost benefit of traditional flip-cap type lens covers. Lens cover 100 also provides the potential advantage of visible confirmation that the optical aperture 104 is open without creating a snag hazard.

The methods and systems of the present disclosure, as described above and shown in the drawings, provide for lens covers with superior properties including simplicity, robustness, and reliability. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A lens cover comprising:
a housing defining an optical aperture;
a pair of opposed lens cover blades each pivotally mounted to the housing at a common pivot point;
a biasing member biasing the blades apart from one another about the pivot point to uncover the optical aperture in an open position;
a pair of magnetic members, each magnetic member mounted to a respective one of the blades to bias the blades together to cover the optical aperture in a closed position, wherein the biasing member and magnetic members provide a bi-stable mechanism that is stable in the open position and in the closed position and has a force threshold that must be overcome between the open position and the closed position; and
a plunger mounted to the housing wherein in the closed position of the blades, the plunger is configured to translate relative to the housing and drive a wedge to separate the blades to a position where the biasing member overpowers the magnetic members to overcome the force threshold of the bi-stable mechanism and drive the blades to the open position.

2. A lens cover as recited in claim 1, further comprising:
a respective pusher arm extending from each blade, wherein the pusher arms are opposed to one another and extend radially outward from the blades, wherein in the open position the pusher arms are configured to be driven inward to a position where the magnetic members overpower the biasing member to secure the blades in the closed position.

3. A lens cover as recited in claim 2, wherein in the open position of the blades, the pusher arms extend visibly beyond the housing.

4. A lens cover as recited in claim 3, wherein a portion of at least one of the pusher arms that is visible beyond the housing in the open position is colored as an indicia of the optical aperture being open.

5. A lens cover as recited in claim 1, wherein the biasing member includes a torsion spring positioned about the pivot point.

6. A lens cover as recited in claim 1, wherein the magnetic means include at least one rare earth magnet.

7. A lens cover as recited in claim 1, wherein the blades are identical to one another and are mounted to the pivot point in mirror image opposition to one another.

8. A lens cover as recited in claim 1, wherein in the closed position the blades overlap one another along a respective ledge defined on each blade.

9. A lens cover as recited in claim 8, wherein the ledge of each blade includes a semicircular protrusion covering a central portion of the optical aperture with the blades in the closed position.

10. A lens cover as recited in claim 1, wherein the blades substantially clear the optical aperture in the open position.

11. A lens cover as recited in claim 1, wherein the pivot point is off-center from the optical aperture.

12. A lens cover as recited in claim 1, wherein the housing includes a pair of plates enclosing the pivot point and between which the blades are substantially hidden in the open position.

13. A lens cover as recited in claim 1, wherein the housing includes channels for mounting the housing to an optical device.

14. An optical device comprising:

an optical component with a lens barrel defining an optical path; and a lens cover as recited in claim 1 mounted to the lens barrel to cover the optical path in the closed position of the blades and to uncover the optical path in the open position of the blades.

15. A lens cover comprising:

a housing defining an optical aperture;

a pair of opposed lens cover blades each pivotally mounted to the housing at a common pivot point;

a biasing member biasing the blades apart from one another about the pivot point to uncover the optical aperture in an open position; and a pair of magnetic members, each magnetic member mounted to a respective one of the blades to bias the blades together to cover the optical aperture in a closed position, wherein in the closed position the blades overlap one another along a respective ledge defined on each blade, and wherein the ledge of each blade includes a semicircular protrusion covering a central portion of the optical aperture with the blades in the closed position.

16. A lens cover comprising:

a housing defining an optical aperture;

a pair of opposed lens cover blades each pivotally mounted to the housing at a common pivot point;

a biasing member biasing the blades apart from one another about the pivot point to uncover the optical aperture in an open position; and a pair of magnetic members, each magnetic member mounted to a respective one of the blades to bias the blades together to cover the optical aperture in a closed position, wherein in the open position of the blades, the pusher arms extend visibly beyond the housing.

17. A lens cover as recited in claim 16, wherein a portion of at least one of the pusher arms that is visible beyond the housing in the open position is colored as an indicia of the optical aperture being open.

* * * * *